United States Patent [19]

Arakawa

[11] Patent Number: 4,766,556

[45] Date of Patent: Aug. 23, 1988

[54] THREE-DIMENSIONAL SOLID OBJECT MANIPULATING APPARATUS AND METHOD THEREFOR

[75] Inventor: Yoshiki Arakawa, Yawata, Japan

[73] Assignee: Matsushita Electric Industrial Co., Ltd., Kadoma, Japan

[21] Appl. No.: 799,655

[22] Filed: Nov. 19, 1985

[30] Foreign Application Priority Data

Nov. 20, 1984 [JP] Japan ................................ 59-245169
Mar. 1, 1985 [JP] Japan .................................. 60-40414

[51] Int. Cl.$^4$ .............................................. G06F 15/20
[52] U.S. Cl. ..................................... 364/522; 340/729; 382/45; 364/521
[58] Field of Search ............................... 364/518–522; 340/703, 723, 724, 729, 747; 382/44–47

[56] References Cited

U.S. PATENT DOCUMENTS 3,816,726  6/1974  Sutherland et al. ............ 340/729 X
3,889,107  6/1975  Sutherland ...................... 340/729 X
4,475,104  10/1984  Shen ................................... 364/521
4,609,917  9/1986  Shen ................................... 340/729

Primary Examiner—Gary V. Harkcom
Assistant Examiner—H. R. Herndon
Attorney, Agent, or Firm—Cushman, Darby & Cushman

[57] ABSTRACT

A three-dimensional solid object manipulating apparatus and means stores elemental data defining at least one elemental three-dimensional solid object and first memory means. Next, a three-dimensional solid shape corresponding to the elemental data is set in a defined space. A hypothetical plane is then set on the defined space and is divided into minute segments with perpendicular lines being set on the minute segments. Data representing intersections of the three-dimensional solid shape and the perpendicular lines is then calculated. The data representing these intersections is then stored in a second memory. Finally, data representing specifications of the three-dimensional solid object are calculated from the data representing the intersections. In a preferred embodiment, calculations are also performed to determine the volume, center of gravity, and moment of inertia of the three-dimensional solid object.

14 Claims, 16 Drawing Sheets

THREE-DIMENSIONAL SOLID OBJECT MANIPULATING APPARATUS AND METHOD THEREFOR

FIELD OF THE INVENTION AND RELATED ART STATEMENT

1. Field of the Invention

The present invention relates generally to a method and an apparatus for analyzing a three-dimensional solid object, and particularly, to method and apparatus for calculation of a volume, a center of gravity and an inertia moment or the like of said object. Furthermore, the invention relates to method and apparatus for producing a display of a cross-sectional view of said object on a two dimensional raster display screen.

2. Description of the Related Art

A three dimensional graphic display apparatus is used to form and to display a three dimensional image on a two-dimensional display. The graphic display apparatus generally has a two dimensional raster display screen of a cathode-ray tube, and the three dimensional image is displayed on it. In providing a three-dimensional representation of an image on a two-dimensional display means, such as the raster display screen using the cathode-ray tube, it is necessary to provide mechanisms for eliminating hidden surfaces and for shading visible surfaces in the image so that a general three-dimensional representation is provided.

In conventional display systems for producing such an effect, a depth buffer or a Z-buffer approach is used, and the hidden surfaces removal problem is solved by the use of a suitable algorithm, sometimes referred to as a depth buffer or a Z-buffer algorithm.

An example of such a display system is shown in U.S. Pat. No. 4,475,104. A conventional system for displaying the three-dimensional image is shown in FIG. 1. In this system, data bases which define three-dimensional images are processed by a solid modeler of a host computer 1 and provide solid image data. These data are converted to polygonal data by the host computer 1, and are transmitted to a display apparatus 2 through a communication interface 13. In the display apparatus 2, the polygonal data are at first memorized by a segment buffer 14 and the hidden surfaces are eliminated by the depth buffer 16 and a microprocessor unit 15.

In the above-mentioned three-dimensional graphic system, only data as to surfaces of an observational side are stored and data as to the hidden surface are abandoned. Therefore, these three-dimensional graphic systems simply display a three-dimensional geometric object, and cannot calculate mass properties of a solid object, for example a volume, a center of gravity or an inertia moment or the like. Furthermore, intersect operation, addition and subtraction of the three-dimensional geometric object cannot be accomplished. In order to accomplish the above-mentioned mass property operation by the three-dimensioned graphic display system, usually a host computer is used. The three-dimensional geometric object is processed by a geometric modeler which is an application program. The host computer accomplishes a generation of geometric data, a geometric operation of a mass property operation, a generation of cross-sectional image and a conversion of geometric data, for example a shift, a rotation and enlargement or compression of the geometric image using the geometric modeler. In such systems, since data processing may include many kinds of conventional processes, for example, a process of geometrically defining the data, solid geometric data, polygonal data, depth data and color data, processing efficiency is not satisfactory.

In solid object modeling technology, two typical concepts of Boundary Representations (B-Reps) and Constructive Solid Geometry (CSG) are used. In the Boundary Representations concept, a three-dimensional object is represented by all surfaces which enclose it, and all sides which encircle the surfaces and all terminal points which define the sides. In the Constructive Solid Geometry, the three-dimensional object is represented by an additional calculation and the geometric operation of three-dimensional foundamental shapes normally referred to as a "primitive", for example a cylinder, a tube, a block, a sphere and a cone. In these representative concepts, data for the display means must be converted to polygonal data. Furthermore, all surfaces which are visible and are invisible from the view point must be also converted to the polygonal data. Therefore, converting efficiency is not sufficient.

OBJECT AND SUMMARY OF THE INVENTION

An object of the present invention is to provide an efficient and practical method for manipulating a three dimensional solid object.

Another object of the present invention is to provide a method for combining a geometric modeler and a three-dimensional graphic display system.

A further object of the present invention is to realize an apparatus for performing the above-mentioned methods.

Three-dimensional solid object manipulating method and apparatus in accordance with the present invention comprises:

a process and means for storing elemental data defining at least one elemental three-dimensional solid objects in a first memory means, a process and means for setting a three-dimensional solid shape corresponding to the elemental data in a defined space, a process and means for setting a hypothetical plane on the defined space and dividing the hypothetical plane to minute segments and setting perpendicular lines on respective minute segments and creating data representing intersections of the three-dimensional solid shape and the perpendiculars, and a process and means for storing the data representing intersections in a second memory means.

DESCRIPTION OF THE PREFERRED EMBODIMENTS

Figure 1:
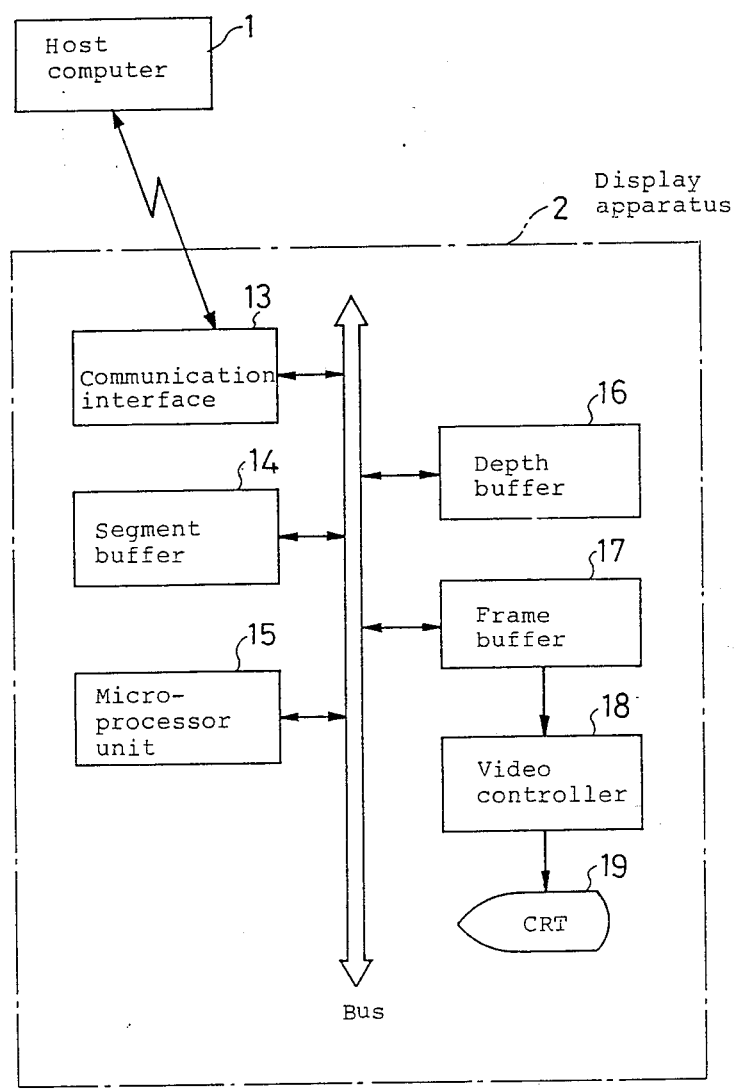
FIG. 1 is a block diagram of the typical three-dimensional geometric manipulating system in the prior art.
Figure 2A:
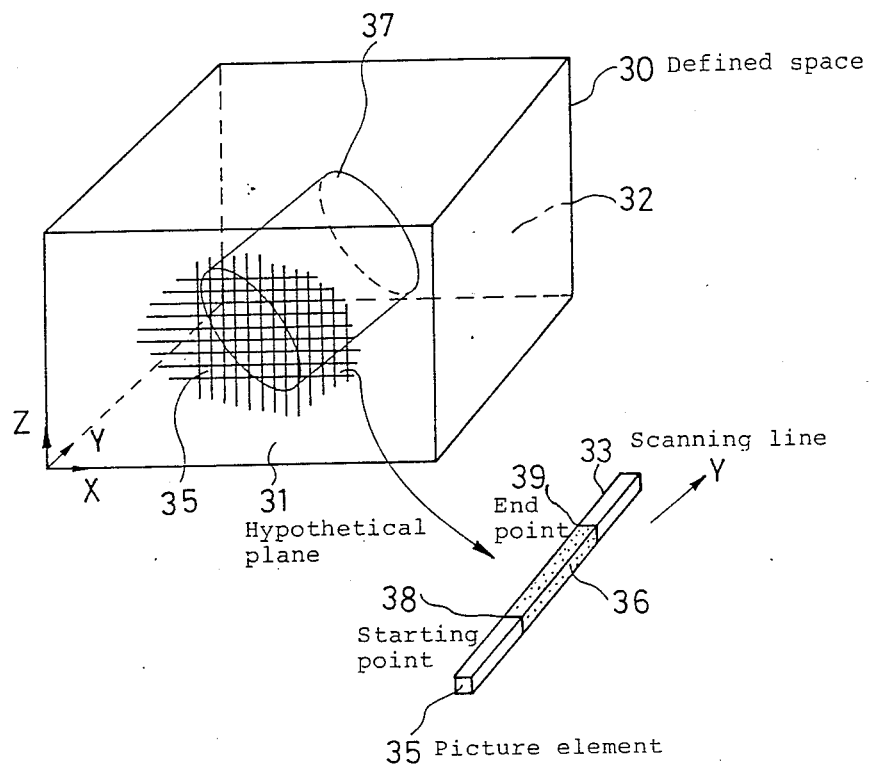
FIG. 2A is a perspective view showing three-dimensional scanning lines and run-length data thereof.
Figure 2B:
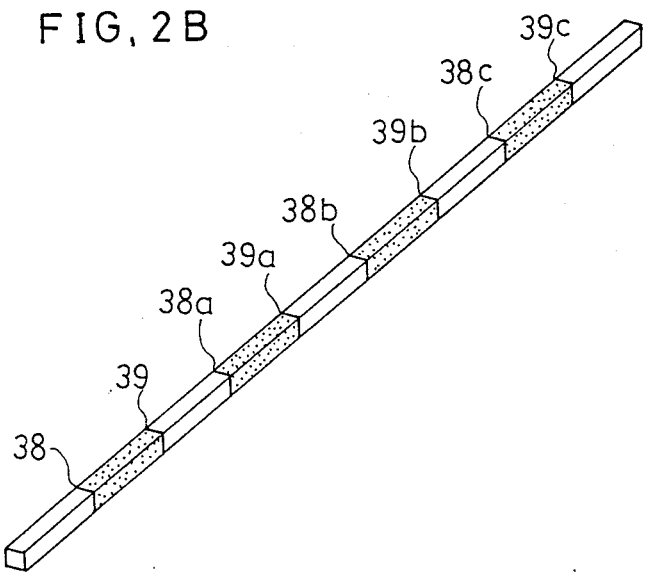
FIG. 2B is a perspective view showing a three dimensional scanning line with four run-length data.
Figure 3:
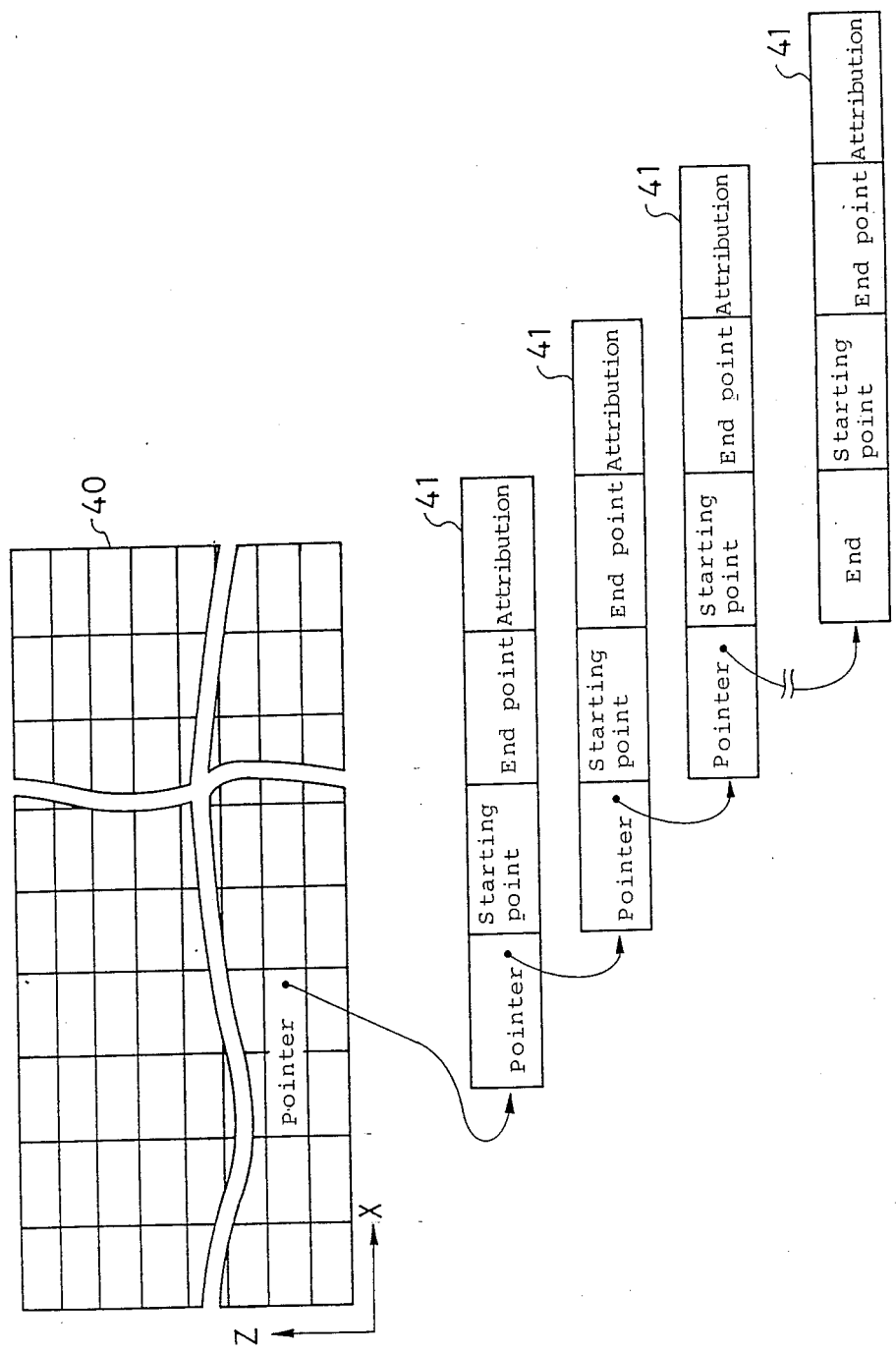
FIG. 3 is detailed data structure of the run-length data.
Figure 4:
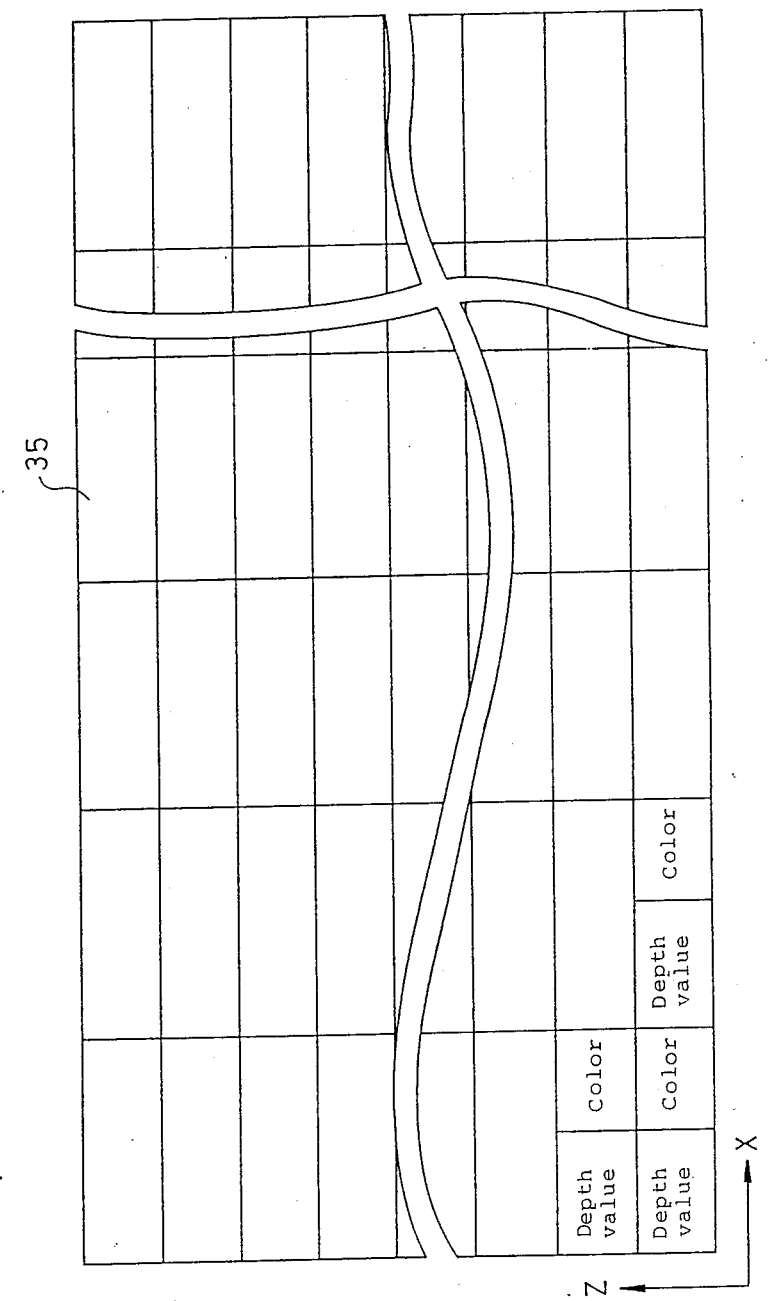
FIG. 4 is a format of a picture buffer.
Figure 5:
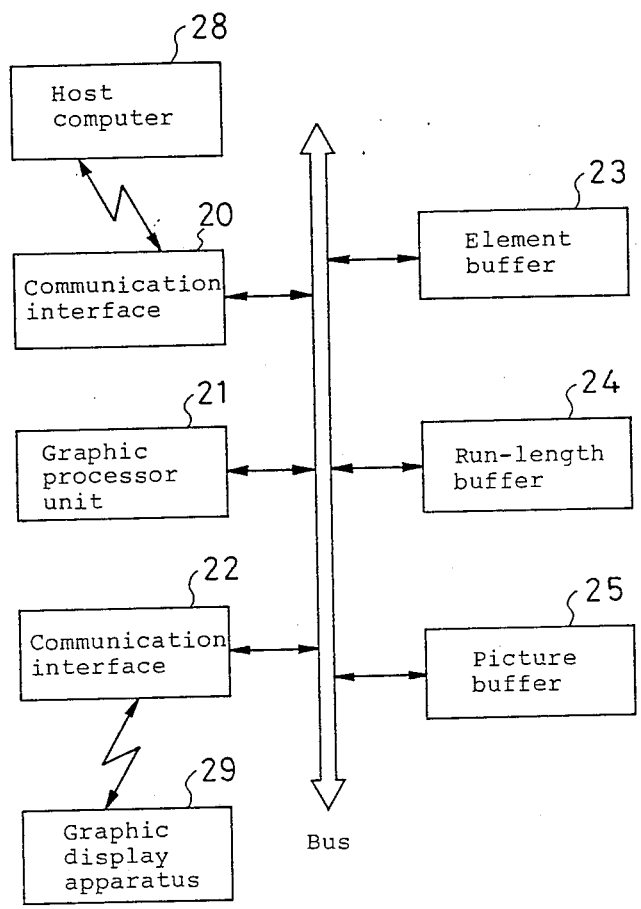
FIG. 5 is a block diagram of a first embodiment of a three-dimensional solid object manipulating system in accordance with the present invention.

A fundamental concept of the three dimensional geometric manipulation in the present invention is shown in FIG. 2A, FIG. 2B, FIG. 3, FIG. 4 and FIG. 5. A three-dimensional solid object generally is represented by a combination of some simple and fundamental three-dimensional solids which have familiar geometric shapes, for example one or more blocks, a cylinder, a cane or a sphere etc, referred to as "a primitive". Therefore, the three-dimensional solid object can be divided into plural primitives, and data representing respective primitives are stored in a first memory means referred to as an element buffer 23 as shown in FIG. 5. A primitive which is taken out of the element buffer 23 is set in a hypothetical defined space 30 as shown in FIG. 2A. In FIG. 2A, a cylinder 37 is created. A hypothetical plane 31 including x-axis and z-axis on a surface of the defined space 30 is divided into minute square segments referred to as a picture element 35. The hypothetical plane 31 is considered as a display screen. Scanning lines 33 which are presumed in the defined space 30 are rectangular parallelepipeds which are perpendicular to the hypothetical plane 31 and have the picture elements 35 as one terminal surface. Therefore, the defined space 30 is formed by an integration of the scanning lines 33. A three-dimensional solid object, for example the cylinder 37 in FIG. 2A, in the defined space 30 is represented by an integration of parts 36 of each scanning line 33 which intersects the three-dimensional solid object 37. The part 36 of a scanning line 33 which intersects the three dimensional solid object 37 is herein referred to as a run-length. The above-mentioned method of representation of the three dimensional solid object is hence named "run-length representation". Data for representing the run-length are called run-length data, and a second memory means provided for storing the run-length data is named a run-length buffer 24. The concept of the run-length is familiar in the technical field of two dimensional graphic manipulation, for example a facsimile. A set of run-length data are shown by data between a starting point 38 and an end point 39 of the intersection part of the scanning line 33. In case the three dimensional solid object has a complex shape, since there are plural intersections, plural numbers of run-length data, for example, four run-length data, are created as shown in FIG. 2B. In FIG. 2B, a region from a starting point 38 to an end point 39 shows a first run-length data, a region from a starting point 38a to an end point 39a shows a second run-length data, a region from a starting point 38b to an end point 39b shows a third run-length data and a region from a starting point 38c to an end point 39c shows a fourth run-length data. A pointer of a head run-length data is set in an area of the scanning line directory 40 of the run-length buffer 24.

The run-length buffer 24 consists of a scanning line directory 40 and run-length data. A pointer which shows the data of the nearest point from the hypothetical plane 31 of each scanning line is stored in the scanning line directory 40. A run-length data has a list structure and has run-length data therein as shown in FIG. 3. The run-length data are formed by a pointer which shows the next run-length data, a starting point of the run-length data, an end point of the run-length data and an attribution. The attribution shows color or a group number of the primitive.

In FIG. 2A, the hypothetical plane 31 is set in the defined space 30, and a view point is on the hypothetical plane 31. The hypothetical plane 31 is divided into a predetermined large number of picture elements 35. Distances from the hypothetical plane 31 to the intersections of the three dimensional solid object 37 are calculated, and data corresponding to a minimum distance to a direction of Y coordinate from the hypothetical plane 31 is referred to as a depth value and is adopted as the distance of the three dimensional solid object 37 from the hypothetical plane 31 of the scanning line 33. These data are one of the run-length data at the picture element 35 and are referred to as picture data. These picture data also contain color data at a spot of the surface of the three dimensional solid object. An integration of the above-mentioned picture data is stored in a picture buffer 25. FIG. 4 shows an arrangement of the picture data in the picture buffer 25. The depth value and the color data corresponding to each picture element are stored in the picture buffer 25.

In order to obtain the picture data from the run-length data, in case the hypothetical plane 31 of the run-length data and the hypothetical plane of the picture data are common, head data of the run-length data of respective scanning lines 33 become picture data. In other words, the depth value and the color data of the picture element 35 are directly calculated from the run-length data of the first pointer which are stored in the scanning line directory 40. Therefore, the picture data are created with very high speed, and the hitherto used hidden surface removing process is not necessary.

A first embodiment of the three dimensional solid object manipulating system of the present invention is shown in FIG. 5. Data of primitives which are input from a host computer 28 through a communication interface 20 are stored in an element buffer 23. The element buffer 23 holds data bases of these primitives. A primitive of the element buffer 23 is converted to three dimensional run-length data by a graphic processor 21, and these run-length data are stored in a run-length buffer 24. The run-length data stored in the run-length buffer 24 are converted to picture data by the graphic processor unit 21, and are stored in the picture buffer 25 as two dimensional graphic data. The graphic data stored in the picture buffer 25 are transmitted to a graphic display apparatus 29 through a communication interface 22. Furthermore, adding and subtracting of solid shapes, calculation of mass properties such as volume, center of gravity or an inertia moment or the like and a creation of a cross sectional image are carried out by the graphic processor unit 21.

Figure 6:
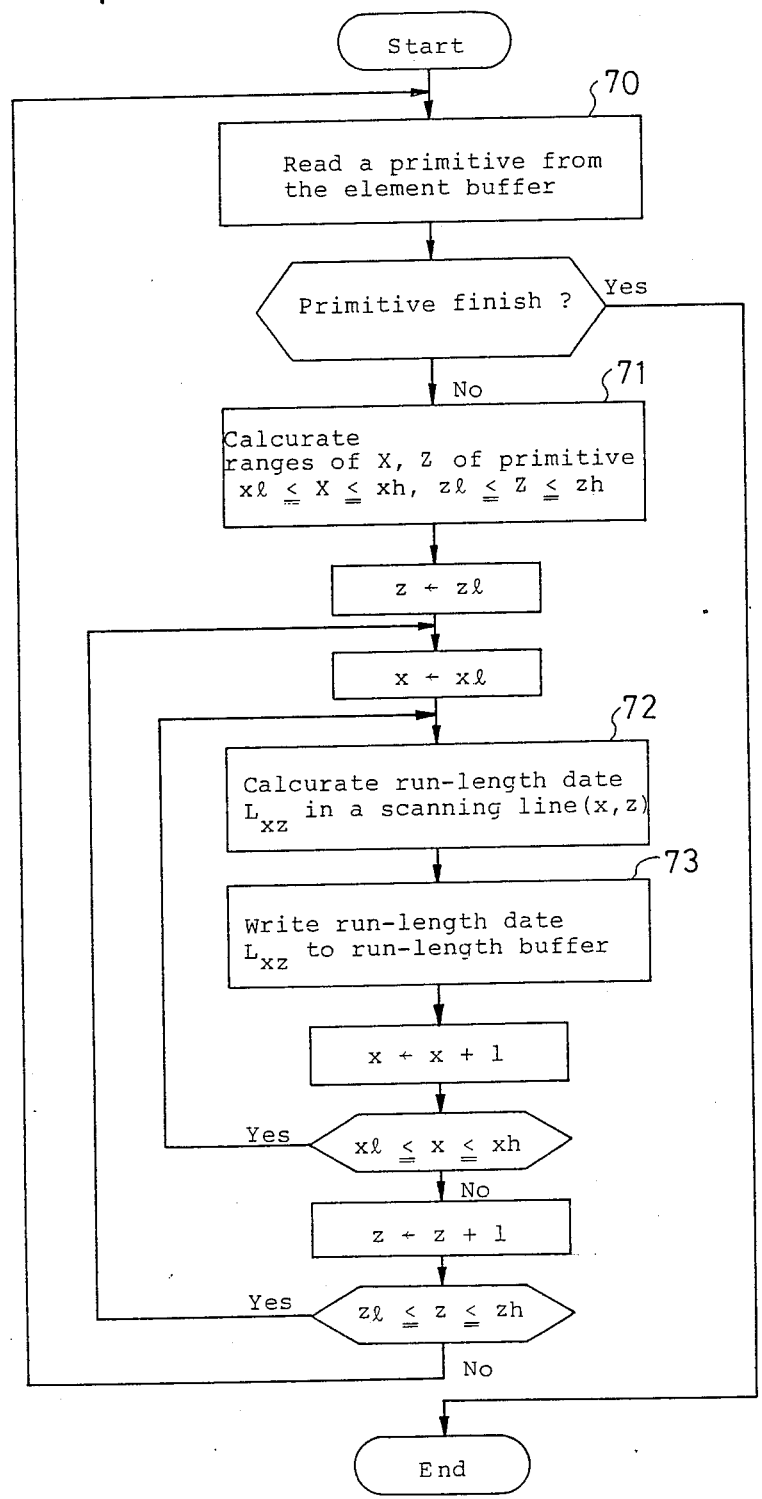
FIG. 6 is a flow chart for creating the run-length data of a primitive object.

A process to create run-length data from a primitive is shown by the flow chart of FIG. 6. A primitive is read out from the element buffer 23 (step 70). Ranges of X coordinates and Z coordinates of a space which are occupied by the primitive in the defined space 30 are calculated (step 71). $x_l$ and $z_l$ show minimum coordinates of the primitive 37, and $x_h$ and $z_h$ show maximum coordinates of the primitive 37 in the defined space 30. An intersection between the primitive 37 and a scanning line is calculated and run-length data $L_{xz}$ of the intersection are created (step 72). The run-length data $L_{xz}$ are written in the run-length buffer 24 (step 73). The process of the step 72 and the step 73 are carried out on the whole range of x coordinates and z coordinates defined in step 71. As a result, the primitive is converted to run-length data by the above-mentioned process. The process is carried out for all primitives stored in the element buffer 23, and the run-length data which are calculated by the above-mentioned process are written in the run-length buffer 24 in order.

Figure 7:
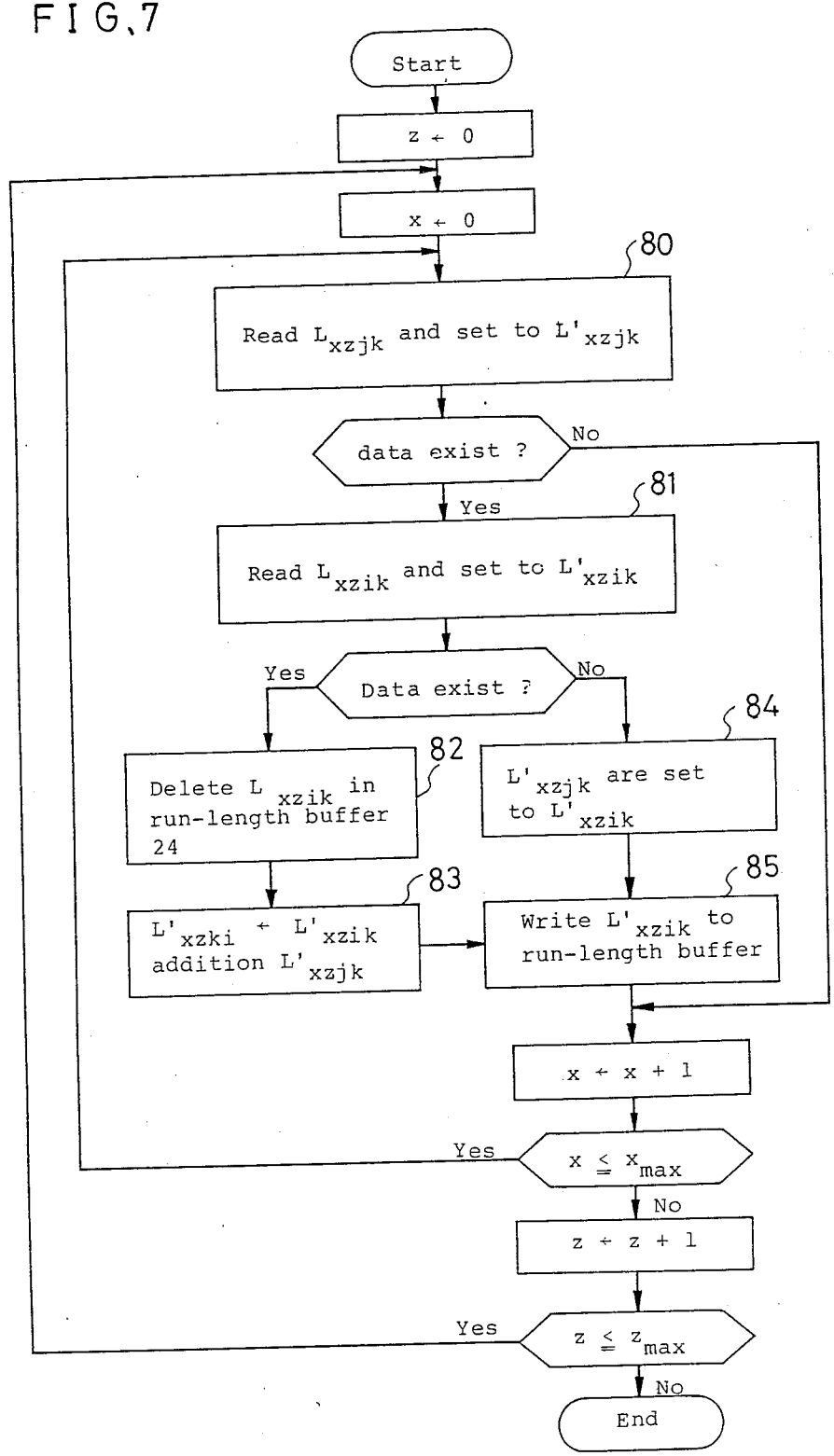
FIG. 7 is a flow chart for adding geometric shapes.

The operation of the solid object is carried out as follows. Addition of the plural solid objects is carried out by the addition of the run-length data as to all the scanning lines. An intersection of the solid objects is obtained by calculation of the run-length data corresponding to intersection parts of the solid objects in the defined space. A subtraction of the solid object is carried out by subtracting the run-length data of a subtrahend solid object from the run-length data of a minuend solid object as to all the scanning lines. The details of the above-mentioned calculating processes are shown by flow charts in FIG. 7, FIG. 8 and FIG. 9. The calculating process concerning the addition of the solid objects is shown in FIG. 7. In this flow chart, a solid object given a number i and a solid object given a number j are added and a new solid object given a number i is created. Firstly, the calculating process is started from an initial scanning line wherein the x coordinate and z coordinate thereof are zero as shown by (0, 0). All run-length data $L_{xzjk}$ (k=1, 2, ...) of the solid object given a number j in scanning line (x, z) are read out from the run-length buffer 24 and set to an operation area of the graphic processor unit 21. Wherein, a suffix k shows the run-length number which is counted from the hypothetical plane 31. When the run-length data $L_{xzjk}$ are set to the operation area, a representation of the run-length data $L_{xzjk}$ is changed to $L'_{xzjk}$ (step 80). If data do not exist, the process of step 80 shifts to a next scanning line in the coordinates of x and z. If data exist, all run-length data $L_{xzik}$ (k=1, 2, ...) of the solid object given a number i in the scanning line (x, z) are read out from the run-length buffer 24 and set to an operation area of the graphic processor unit 21. When the run-length data $L_{xzik}$ are set to the operation area, the representation of the run-length data $L_{xzik}$ are changed to $L'_{xzik}$ (step 81). If data do not exist, the run-length data $L'_{xzjk}$ are set to $L'_{xzik}$ (step 84). If data exist, all the run-length data $L_{xzik}$ of the scanning line (x, z) in the run-length buffer 24 are deleted (step 82). An addition of the run-length data $L'_{xzik}$ and $L'_{xzjk}$ is calculated (step 83). The added run-length data $L'_{xzik}$ are written to the run-length buffer 24 as run-length data on the scanning line (x, z) of the solid object i (step 85). These steps 80–85 are carried out as to all the scanning lines (x, z).

Figure 8:
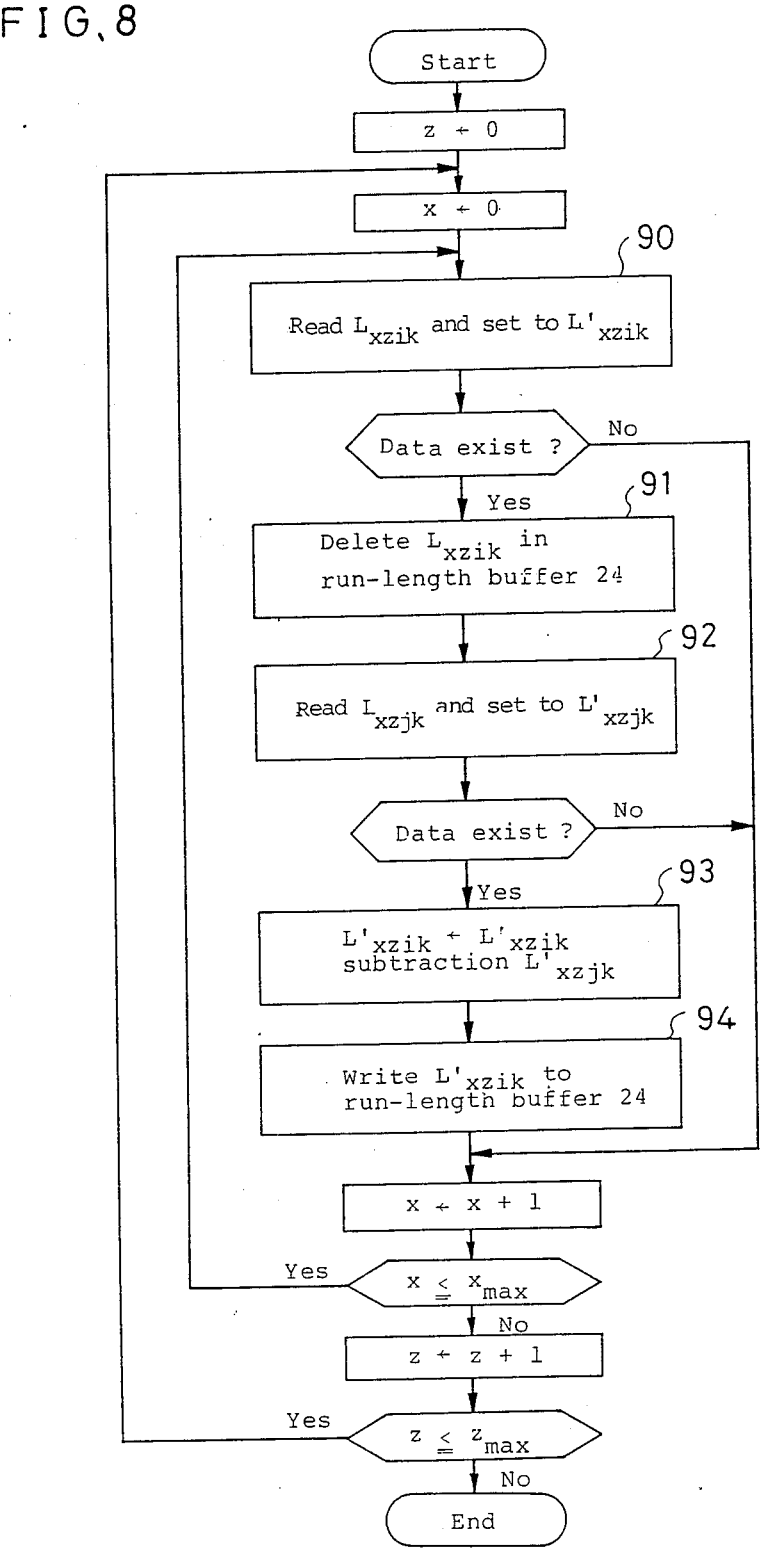
FIG. 8 is a flow chart for a subtracting geometric shapes.

A subtraction of the solid objects is shown in the flow chart of FIG. 8. Common run-length data corresponding to a solid object i and a solid object j in the same scanning line (x, z) are subtracted from the run-length data of the solid object i and a new solid object i is created. The subtraction process is started from an initial scanning line wherein the x coordinate and z coordinate thereof are zero as shown by (0, 0). All run-length data $L_{xzik}$ (k=1, 2, ...) of the solid object assigned a number i in scanning line (x, z) are read out from the run-length buffer 24 and set to an operation area of the graphic processor 21, when the run-length data $L_{xzik}$ are set to the operation area, a representation of the run-length data $L_{xzik}$ is changed to $L'_{xzik}$ (step 90). If data do not exist, the process of step 90 shifts to a next scanning line in the coordinates of x and z. If data exist, all run-length data $L_{xzjk}$ (k=1, 2, ...) of the solid object given a number j in the scanning line (x, z) are read out from the run-length buffer 24 and set to the operation area of the graphic processor unit 21. When the run-length data $L_{xzjk}$ are set to the operation area, the representation of the run-length data $L_{xzjk}$ are also changed to $L'_{xzjk}$ (step 91). If data do not exist, the processes 90–91 shift to the next scanning line in the coordinates of x and z. If data exist, all run-length data $L'_{xzik}$ are compared with the run-length data $L'_{xzjk}$, and the overlapping part thereof is subtracted from the run-length data $L'_{xzik}$ (step 92). All run-length data $L'_{xzik}$ of the scanning line (x, z) in the run-length buffer 24 are deleted (step 93). The run-length data $L'_{xzik}$ obtained in the step 92 are written again in the run-length buffer 24 (step 94). These steps 90–94 are carried out as to all the scanning lines (x, z).

Figure 9:
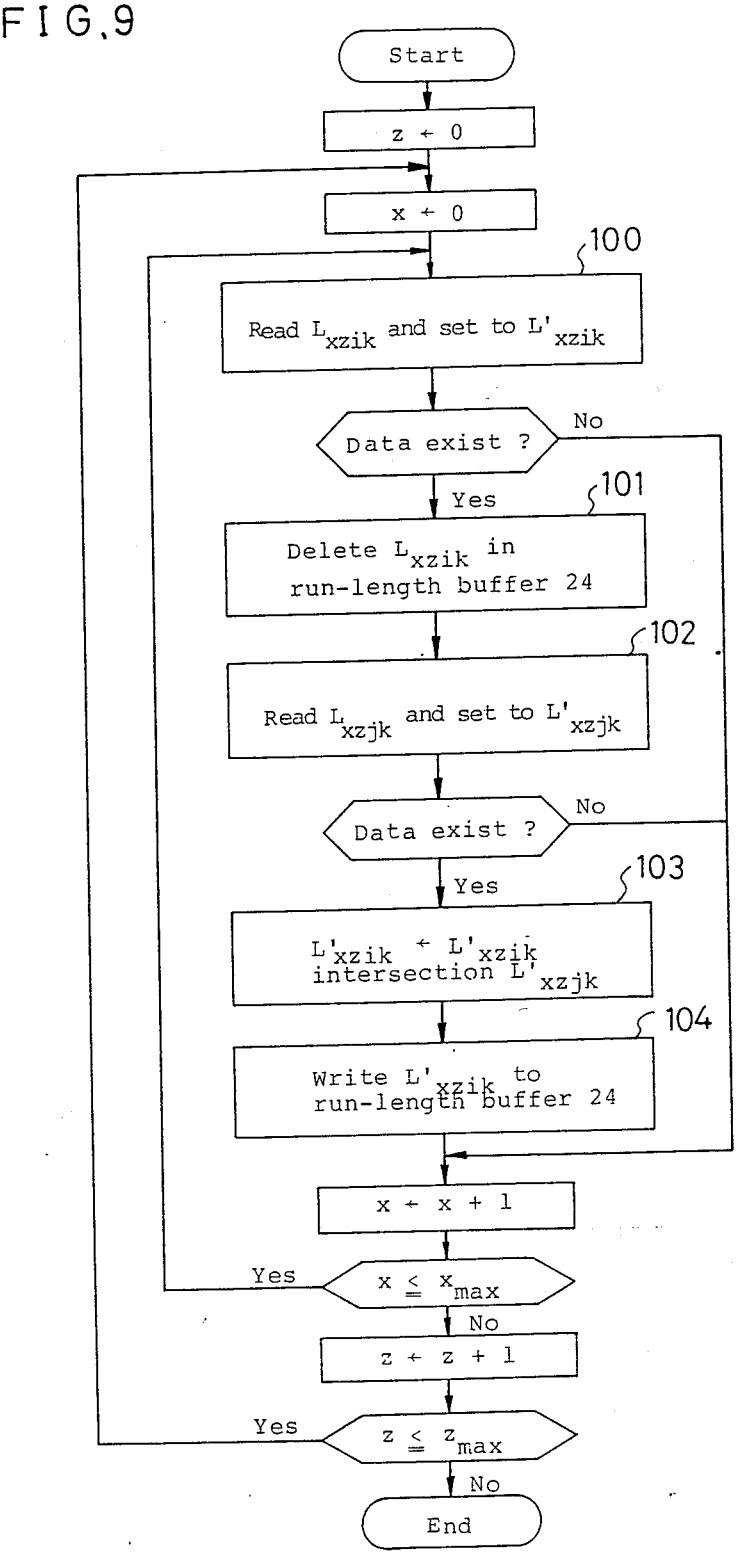
FIG. 9 is a flow chart for calculating an intersection of the geometric shapes.

An intersect operation processes of the solid objects i and j are shown in a flow chart of FIG. 9. Common run-length data corresponding to a solid object i and j in the same scanning line are written on the run-length buffer 24 as new run-length data of the solid object i, and the run-length data which have no common run-length data in the same scanning line are deleted. The above-mentioned processes are applied to the run-length data of all scanning lines. As a result, new run-length data of the solid object i represent an intersect object of the both solid object i and j.

In the flow chart of FIG. 9, all run-length data $L_{xzik}$ (k=1, 2, ...) of the solid object assigned with a number i in the scanning line (x, z) are read out from the run-length buffer 24 and set to an operation area of the graphic processor 21, when the run-length data $L_{xzik}$ are set to the operation area, a representation of the run-length data $L_{xzik}$ is changed to $L'_{xzik}$ (step 100). If data do not exist, the process of step 100 shifts to a next scanning line in the coordinates of x and z. If data exist, all run-length data $L_{xzik}$ of the scanning line (x, z) in the run-length buffer 24 are deleted (step 101). All run-length data $L_{xzjk}$ (k=1, 2, ...) of the solid object given a number j in the scanning line (x, z) are read out from the run-length buffer 24 and set to the operation area of the graphic processor unit 21. When the run-length data $L_{xzjk}$ are set to the operation area, the representation of the run-length data $L_{xzjk}$ are also changed to $L'_{xzjk}$ (step 102). If data do not exist, the processes 100–102 shift to the next scanning line in the coordinates of x and z. If data exist, intersection parts of all the run-length data $L'_{xzik}$ and $L'_{xzjk}$ in the scanning lines (x, z) are set to the run-length data $L'_{xzik}$ (step 103). All the run-length data $L'_{xzik}$ are written again in the run-length buffer 24 (step 104). These steps 100–104 are carried out as to all the scanning lines (x, z).

The mass-properties operations are performed by following processes. Mass-properties of a solid object i are calculated as follows. Starting point data and end point data of run-length data of a scanning line at coordinates (x, z) are represented by $Y_{xzik}{}^s$ and $Y_{xzik}{}^e$, respectively. The suffix k shows the run-length data number on the coordinate axis Y of the scanning line at coordinates (x, z). A length $Y_{xzik}{}^{es}$ between the starting point and the end point of the run-length data of the scanning line at coordinates (x, z) is calculated by a subtraction of the starting point $Y_{xzik}{}^s$ from the end point $Y_{xzik}{}^e$ as shown in the following equation.

$$Y_{xzik}{}^{es} = Y_{xzik}{}^e - Y_{xzik}{}^s$$

Therefore, a volume V of the three dimensional solid object is shown by the following equation (1).

$$V = \sum_{x,z} \sum_{k} Y_{xzik}^{es} \qquad (1)$$

Moreover, a center of gravity G (x, y, z) is shown by an equation (2).

$$G(x, y, z) = \left( \left\{ \sum_x X \left( \sum_{z,k} Y_{xzik}^{es} \right) \right\} / V, \right. \qquad (2)$$

$$\left\{ \sum_{x,z,k} \frac{Y_{xzik}^s + Y_{xzik}^e}{2} Y_{xzik}^{es} \right\} / V, \left( \sum_z Z \left( \sum_{zx,k} Y_{xzik}^{es} \right) \right) / V$$

A moment of inertia in case the rotation axis is a line connecting two points $(x_1, y_1, z_1)$ and $(x_2, y_2, z_2)$ I is calculated by the following equation (3).

$$I = \sum_{x,z,k} \left\{ (1 - u^2) \left( x'^2 + \frac{1}{12} \right) + \right. \qquad (3)$$

$$(1 - v^2)(y'_1{}^2 + y'_1 y'_2 + y'_2{}^2)/3 -$$

$$v(ux' + wz)(y'_1 + y'_2) - 2uwx'z' \} Y_{xzik}^{es} \ldots \text{ where,}$$

$$x' = x - x_1, y'_1 = Y_{xzik}^s - y_1, y'_2 = Y_{xzik}^e - y_1, Z' = Z - Z_1,$$

$$r = \sqrt{(x_2 - x_1)^2 + (y_2 - y_1)^2 + (z_2 - z_1)^2},$$

$$u = (x_2 - x_1)/r, v = (y_2 - y_1)/r, w = (z_2 - z_1)/r.$$

where, a distance between the starting point $Y_{xzik}{}^s$ and an axis of rotation of the three dimensional solid object is represented by $r_{xzik}{}^s$ and a distance between the end point $Y_{xzik}{}^e$ and the axis of rotation of the three dimensional solid object is represented by $r_{xzik}{}^e$.

Figure 10:
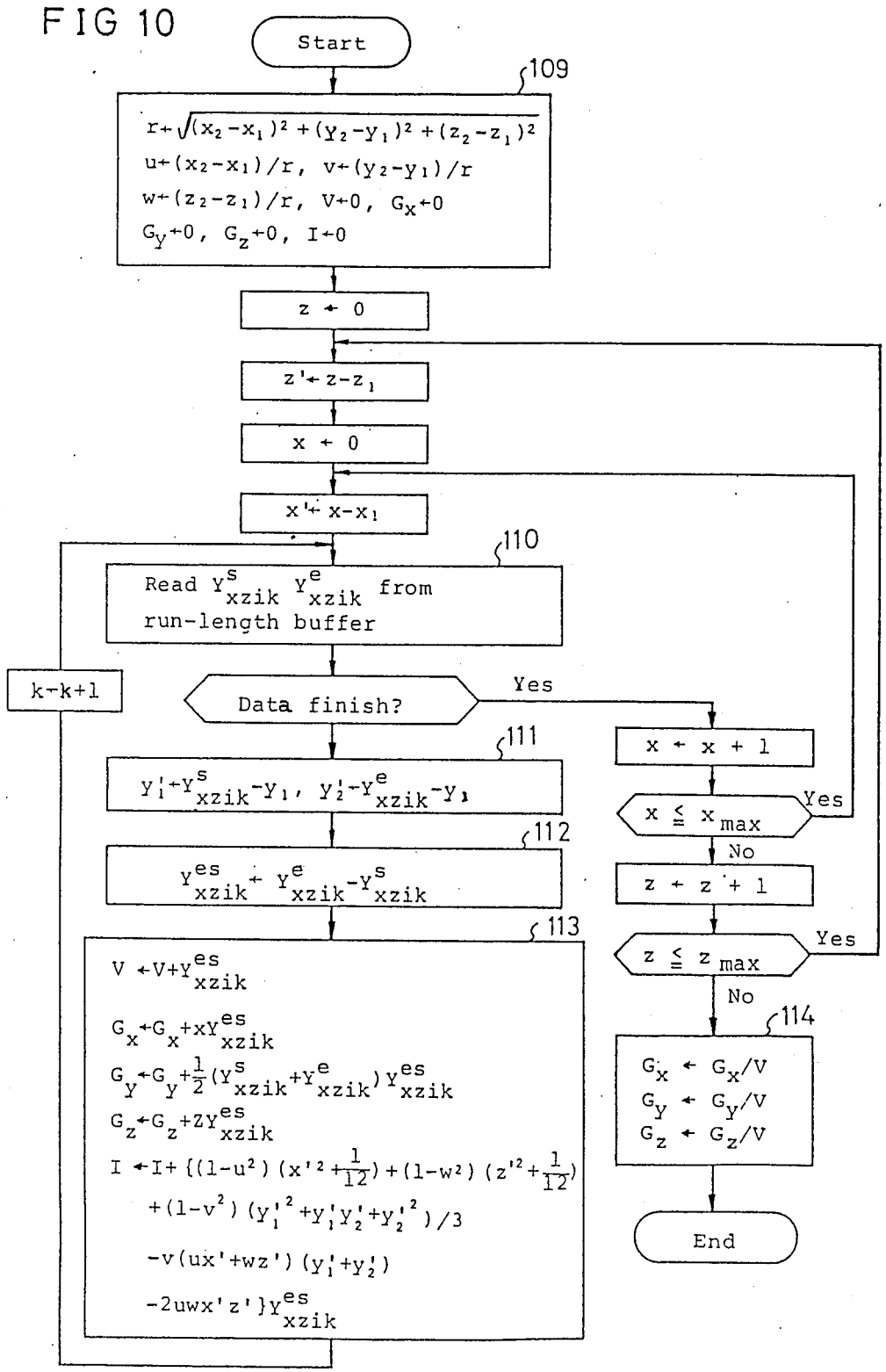
FIG. 10 is a flow chart for calculating-mass-properties.

The above-mentioned mass properties operations are elucidated in detail by a flow chart in FIG. 10. Firstly, r, u, v, and w are calculated. Then data of the volume V, the center of gravity ($G_x$, $G_y$, $G_z$), the moment of inertia I and the coordinates (x, z) are set to zero. Furthermore, z' and x' are calculated. Secondly, the starting point data $Y_{xzik}{}^s$ and the end point data $Y_{xzik}{}^e$ are read out from the run-length buffer 24 in order in a step 110. $y'_1$ and $y'_2$ are calculated in a step 111. The length $Y_{xzik}{}^{es}$ is calculated in a step 112. The volume V, the center of gravity ($G_x$, $G_y$, $G_z$) and the moment of inertia I are calculated in step 113. The above-mentioned processes of step 110, 111, 112 and 113 are applied to the run-length data of all scanning lines (x, z). Finally, the volume V, the center of gravity ($G_x$, $G_y$, $G_z$) and the moment of inertia I are obtained in a step 114.

In a plane-cut operation, a three dimensional solid object is cut with a defined cutting plane, and a two-dimensional cross-section is created by the cutting plane as a profile. Data of the cross-sectional plane is calculated by the following processes. Run-length data which exist inside of the cross-sectional plane are retained and the run-length data which exist outside of the cross-sectional plane are deleted.

Figure 11:
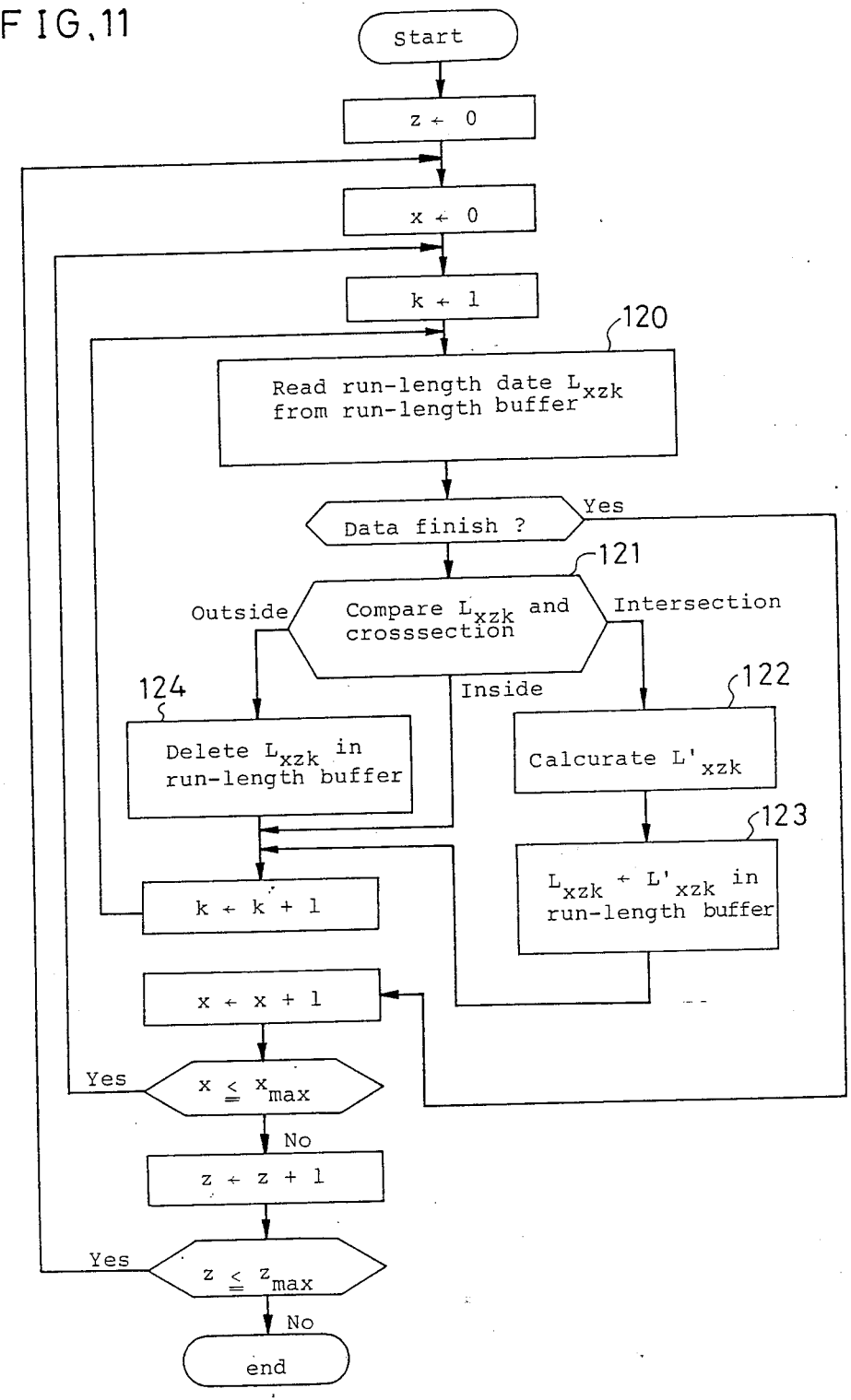
FIG. 11 is a flow chart for creating cross-sectional data of a solid geometry.

The above-mentioned plane-cut operation are detailed by a flow chart in FIG. 11. A cross-sectional plane of a solid object i is calculated as follows. Firstly, the coordinates (x, z) of the scanning line are set to zero, and a run-length data number k in a scanning line (x, z) is set to 1. Run-length data $L_{xzik}$ (k=1, 2, 3, ...) are read out from the run-length buffer 24 in a step 120. Secondly, coordinates of the run-length data $L_{xzik}$ are compared with coordinates of the cross-sectional plane in a step 121. In case that the run-length data $L_{xzik}$ is inside of the cross-sectional plane, the process go to the step 120 to read further run-length data $L_{xzik}$. In case the run-length data $L_{xzik}$ intersect with a cross-sectional plane, data at an intersectional point of the run-length data $L_{xzik}$ and the cross-sectional plane are calculated. Furthermore, it is examined which of a starting point and an end point of the run-length data $L_{xzik}$ are outside of the cross-sectional plane, and the run-length data which are outside of the cross-sectional plane are adapted as the data of the intersectional point, and are represented by $L'_{xzik}$ in a step 122. A part of run-length data which is outside of the cross-sectional plane is deleted and the remainder are retained as the run-length data $L'_{xzik}$. The run-length data $L_{xzik}$ in the run-length buffer 24 are exchanged with the run-length data $L'_{xzik}$ in a step 123. In case the run-length data $L_{xzik}$ an outside of the cross-sectional plane, the run-length data $L_{xzik}$ in the run-length buffer are deleted in a step 124. The above-mentioned processes of the step 120, 121, 122, 123 and 124 are performed on all the run-length data of the scanning lines at coordinates (x, z). As a result, data of the cross-sectional plane are created.

Image display data for displaying a three dimensional solid shape are created from the picture data by following processes. The picture data contain the depth value of each scanning line, and when the depth value in a scanning line at coordinates (x, z) is shown by $d_{x,z}$, a vector $e_{x,z}$ representing inclination of the three dimensional solid shape is shown by an equation (4).

$$e_{x,z} = (d_x, d_z) = (d_{x+1,z} - d_{x,z}, d_{x,z+1} - d_{x,z}) \qquad (4).$$

Figure 12:
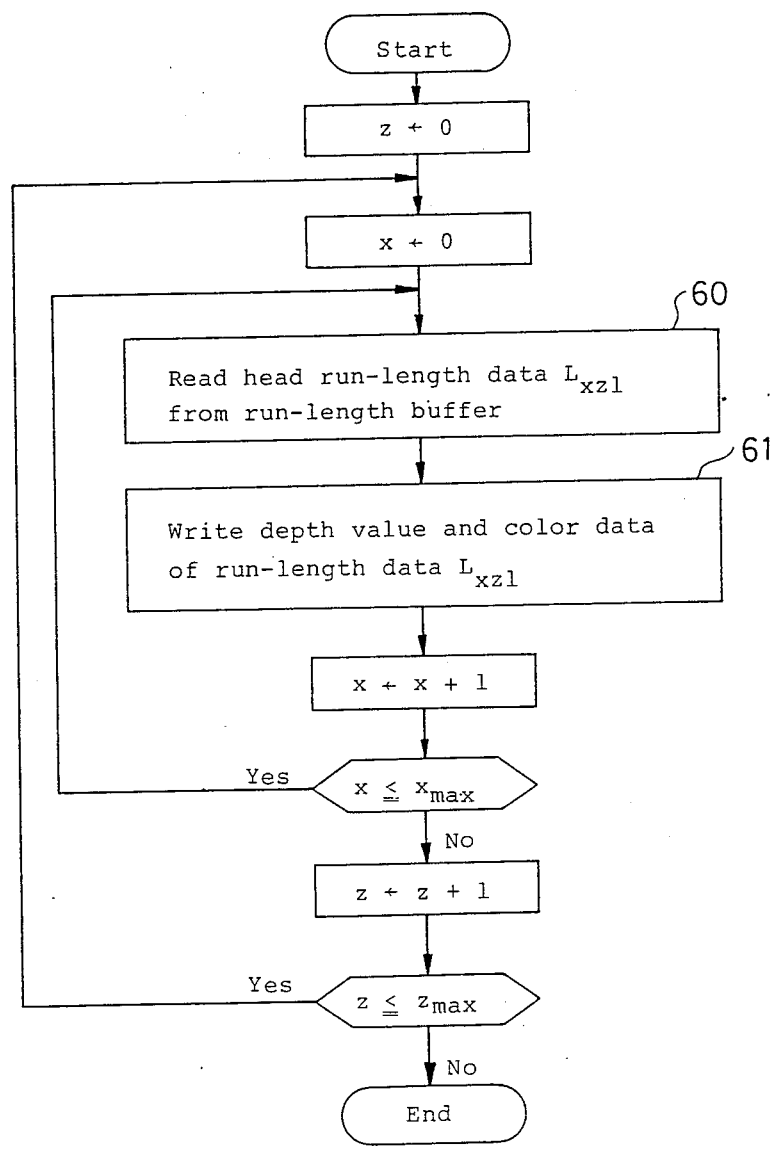
FIG. 12 is a flow chart for creating picture data from the run-length data.

The image display data are created by addition of suitable color data and contrast data corresponding to the inclination of the three dimensional solid shape. The color data ($P_r$, $P_g$, $P_b$)$_{x,z}$ of the picture element (x, z) are decided for each primitive. Symbols $P_r$, $P_g$ and $P_b$ show intensity of color of red, green and blue, respectively. Generally, in order to display a three dimensional solid shape on a two dimensional display screen, visual surfaces which are observed are colored with suitable colors and the observer can distinguish various surfaces displayed on the two dimensional display screen. In case the reality of images in the two dimensional display, for example, texture or shadow, is not necessary, the representation of inclination of the three dimensional solid shape can be shown by scalar. One example of equation for the intensity of color is shown by equation (5). In the equation (5), the inclination $e_{x,z}$ is shown by scalar.

$$e_{x,z} = a(d_{x+1,z} - d_{x,z}) + b(d_{x,z+1} - d_{x,z}) + c \quad (5)$$

Where a, b and c are constants. Color image display data $F_{x,z}$ in a picture element at coordinates (x, z) are shown by an equation (6).

$$F_{x,z} = (F_r, F_g, F_b)_{x,z} = e_{x,z}(P_r \cdot P_g \cdot P_b)_{xz} + (C_r, C_g, C_b)_{x,z} \quad (6),$$

where, $C_r$, $C_g$ and $C_b$ are constants. As a result, the color image display data which show an image by intensity of color are created. This color image display data are named frame data, and the frame data are stored in a frame buffer 26. The above-mentioned processes for creating the image display data from the run-length data are shown by a flow chart in FIG. 12. This flow chart shown an algorithm for calculating a two dimensional solid shape which is observed from a minus direction of the Y coordinate. Therefore, the view point coincides with the hypothetical plane 31 of the defined space 30, and the hypothetical plane 31 corresponds to a display screen. Image display data of a solid object is calculated as follows. Firstly, the coordinates (x, z) of the scanning line are set to zero. A head run-length data $L_{xzih}$ of the scanning line at coordinates (x, z) are read out from the run-length buffer 24 in a step 60. Secondly, data of a starting point and color data of the head run-length data $L_{xzil}$ are written in the picture buffer 25 corresponding to picture element at coordinates (x, z) in a step 61. The above-mentioned step 60 and step 61 are carried out as to all scanning lines, and the picture data are created. As mentioned above, since the view point coincides with the hypothetical plane 31, the data of the three dimensional solid object can be converted to two dimensional image display data without the hidden surface eliminating process.

Figure 13:
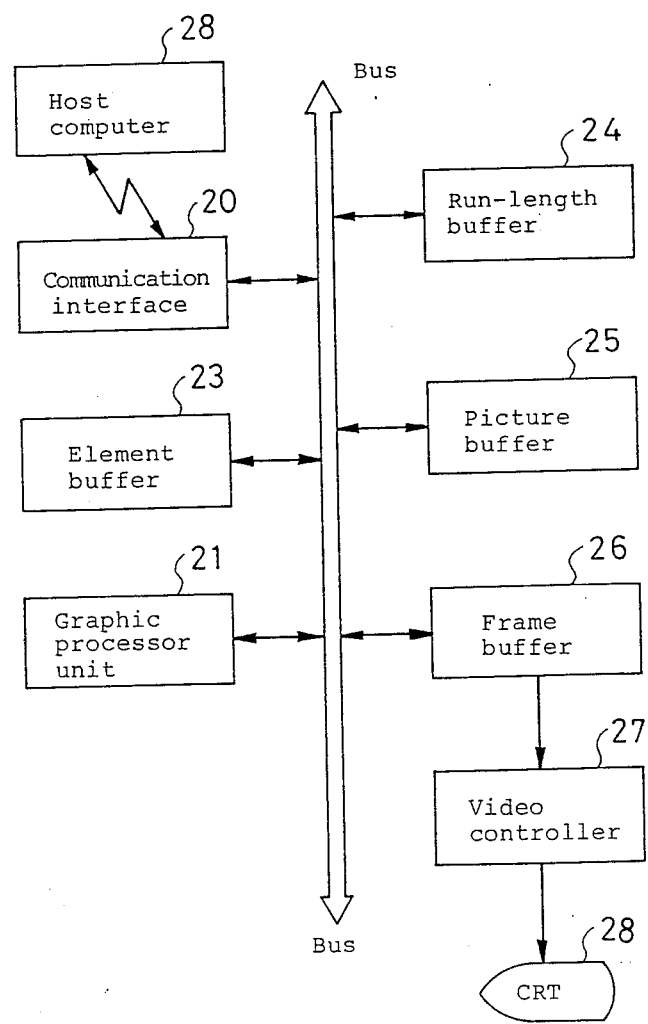
FIG. 13 is a block diagram of a second embodiment of the three-dimensional solid object manipulating system in accordance with the present invention.

The graphic display apparatus 29 as shown in FIG. 5 consists of the frame buffer 26, a video controller 27 and a raster type display screen using cathode ray tube 28 as shown in FIG. 13. This graphic display apparatus is combined with the picture buffer 25 in an embodiment as shown in FIG. 13. The color image display data from the graphic processor unit 21 are stored in the frame buffer 26. The data of the frame buffer 26 are displayed on the cathode ray tube 28 through the video controller 27.

Figure 14:
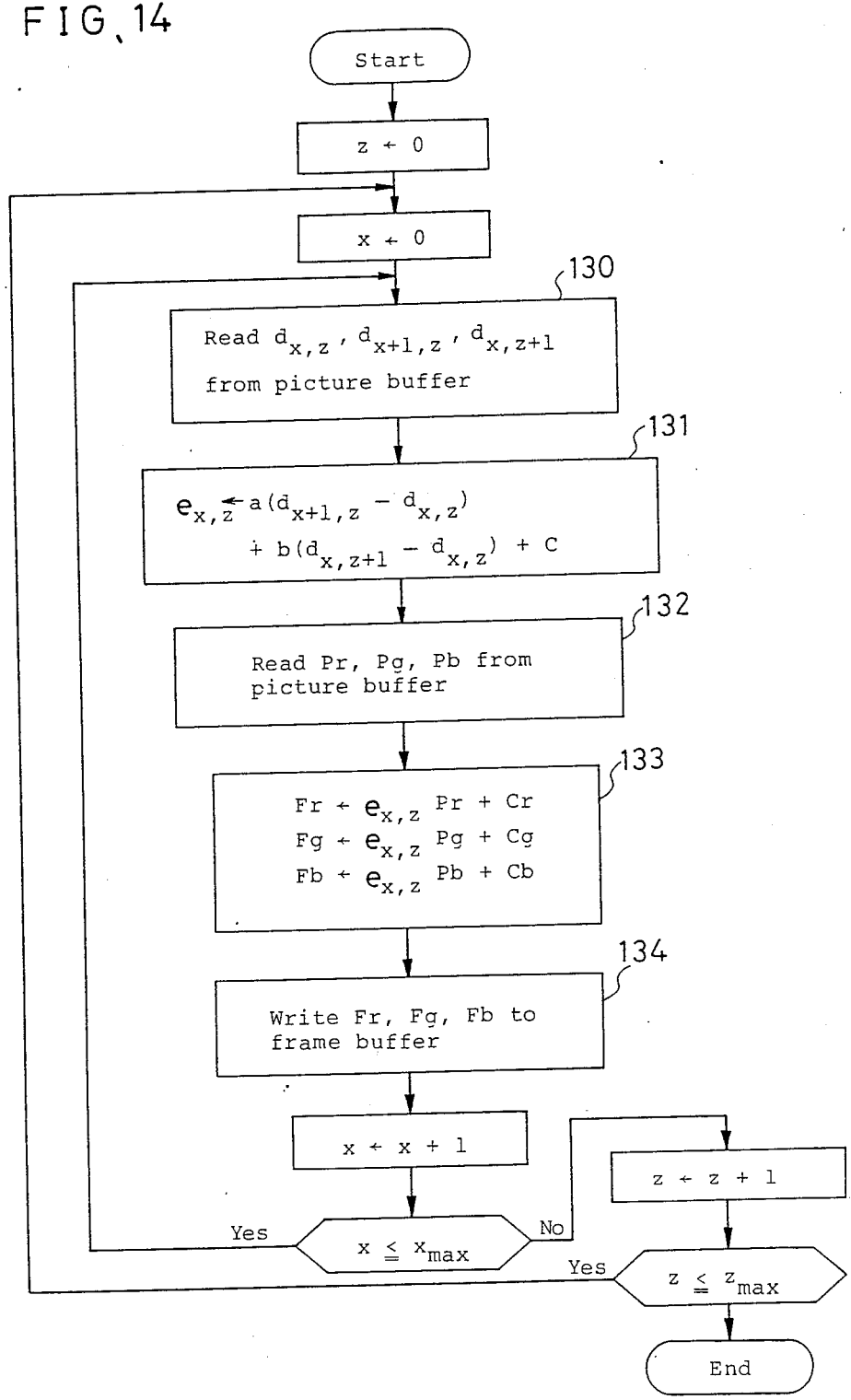
FIG. 14 is a flow chart for creating frame data from picture data.

Processes for converting picture data to frame data are shown in the flow chart of FIG. 14. Firstly, coordinates (x, z) of picture elements 35 are set to zero. Secondly, a depth value $d_{x,z}$ of the picture element 35 are coordinates (x, z), a depth value $d_{x+1,z}$ of the picture element at coordinates (x+1, z) and a depth value $d_{x,z+1}$ of a picture element at coordinates (x, z+1) are read out of the picture buffer 25 in step 130. Inclination data $e_{x,z}$ of the three dimensional solid shape are calculated in a step 131 by equation (5). Thirdly, the color data $P_r$, $P_g$ and $P_b$ are read out from the picture element (x, z) of the picture buffer 25 in a step 132, therein, symbol $P_r$, $P_g$ and $P_b$ show intensity of red, green and blue, respectively. The intensity data $F_r$, $F_g$, $F_b$ of each color in the picture element at coordinates (x, z) are calculated in step 133 as a scalar of the equation (6). The intensity data $F_r$, $F_g$, $F_b$ of each color are written in the frame buffer 26 in step 134. The above-mentioned steps (130, 131, 132, 133, and 134) are applied to all the picture elements at coordinates (x, z). As a result the color image display data in the frame buffer 26 are created from the picture buffer 25.

Figure 15:
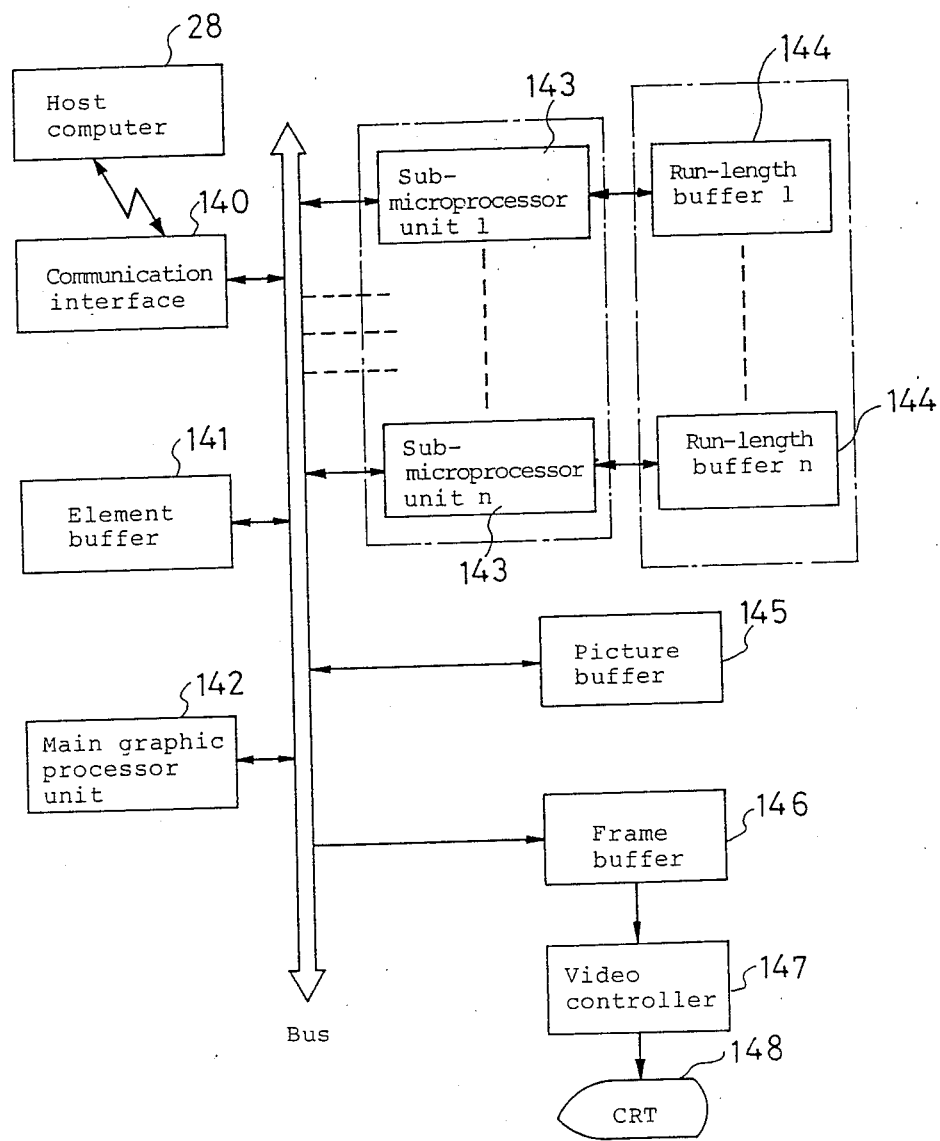
FIG. 15 is a block diagram of a third embodiment of the three-dimensional solid object manipulating system in the present invention.
Figure 16:
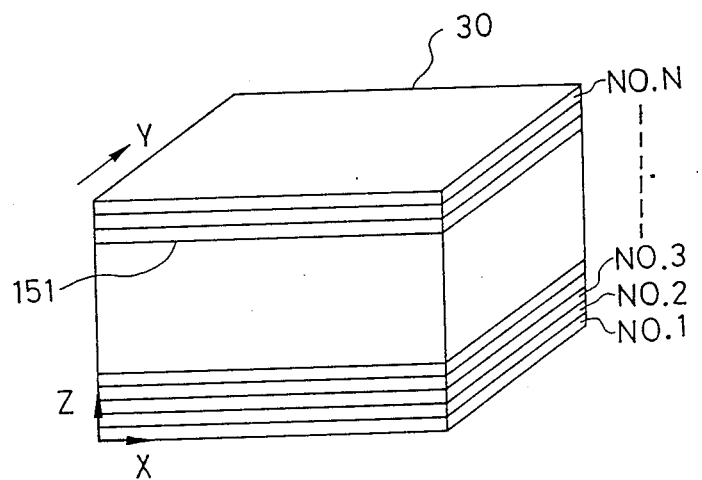
FIG. 16 is a perspective view showing a sharing of a defined space for data processing by plural sub-microprocessors.

A third embodiment of the present invention is shown in FIG. 15. In this embodiment, a graphic processor consists of plural sub-microprocessor units 143 and a main graphic processor unit 142, and data processings are carried out in parallel. Furthermore, plural run-length buffers 144 are combined with the corresponding sub-microprocessor units 143. This embodiment has the same structure as the second embodiment except for the above-mentioned sub-microprocessor units 143 and the run-length buffers 144. The plural sub-microprocessor units 143 carry out a calculation to create run-length data, calculation of solid shape and mass properties, creation of cross-sectional planes and image display data, and a main graphic processor unit 142 carries out the remaining operations. In this embodiment, the operation of the run-length data of the scanning lines are manipulated by the plural sub-microprocessor units 143. An example of a method for manipulating the scanning lines to the plural sub-microprocessor units 143 is shown in FIG. 16. In FIG. 16, a defined space 30 is divided into N parts of defined planes 151 which are parallel to a plane including x and y coordinates. The defined planes 151 are numbered serially from the smallest number of z coordinates, for example, from the bottom of the defined space 30 as shown in FIG. 16. This number is referred to as a "defined plane number m". In FIG. 16, the defined space 30 is divided into N. In case the numbers of the sub-microprocessor units 143 are n, the defined planes are given the number J (J=1, 2 ... N) which are represented by the following equation (7) and are distributed to the sub-microprocessors 143 which are given the number I (I=1, 2, ... n):

$$I \equiv J(\text{mod } n) \quad (7).$$

Therefore, the defined planes given the numbers I, I+n, I+2n, I+3n ... are manipulated by the sub-microprocessor I.

As mentioned above, since the data of the three dimensional solid object are represented by run-length data in the present invention, the run-length data corresponding to each scanning line are independent and do not interfere to each other. Therefore, data processing can be carried out in parallel and is suitable for processing by a computer. As the result, a data processing speed in the third embodiment is higher than the speed in the second embodiment, and the processing speed depends on the number of the sub-microprocessor units. Furthermore, since the data are represented by a constant length, compilation of data, for example, insertion or deletion of data, can be carried out with high speed, and a garbage collection is not necessary.

What is claimed is:

1. Three-dimensional solid object manipulating apparatus comprising:

first memory means for storing elemental data defining at least one elemental three-dimensional solid object;

means for setting in a defined space a three-dimensional solid shape corresponding to said elemental data;

means for setting a hypothetical plane on the defined space and dividing said hypothetical plane into minute segments and setting perpendicular lines on said minute segments and calculating data representing intersections of said three-dimensional solid shape and said perpendicular lines; on said minute segments and calculating data representing intersections of said three-dimensional solid shape and said perpendicular lines;

second memory means for storing said data representing intersections; and means for calculating data representing specifications of said three dimensional solid object from said data representing intersections of said three dimensional solid shape and said perpendicular lines.

2. Three-dimensional solid object manipulating apparatus in accordance with claim 1, wherein said means for calculating data includes means for calculating a volume, a center of gravity and a moment of inertia of said three-dimensional solid object.

3. Three-dimensional solid object manipulating apparatus in accordance with claim 1, wherein said means for calculating data includes means for calculating an addition, intersection, and subtraction of a plurality of three dimensional objects.

4. Three-dimensional solid object manipulating apparatus in accordance with claim 1, wherein said means for calculating data includes means for creating image display data.

5. Three-dimensional solid object manipulating apparatus in accordance with claim 1, wherein said means for calculating data includes means for calculating data of a cross-section of said three-dimensional solid shape.

6. A three-dimensional solid object manipulating method comprising the steps of:

storing elemental data defining at least one elemental three-dimensional solid object in a first memory means;

setting in a defined space a three-dimensional solid shape corresponding to said elemental data;

setting a hypothetical plane on said defined space and dividing said hypothetical plane into minute segments and setting perpendicular lines on said minute segments and calculating data representing intersections of said three-dimensional solid shape and said perpendicular lines; and a process for storing said data representing intersections in a second memory means.

7. A three-dimensional solid object manipulating method comprising the steps of:

storing elemental data defining at least one elemental three-dimensional solid object in a first memory means;

setting in a defined space a three-dimensional solid shape corresponding to said elemental data;

setting a hypothetical plane on said defined space and dividing said hypothetical plane into minute segments and setting perpendicular lines on said minute segments and creating data representing intersections of said three-dimensional solid shape and said perpendicular lines;

storing said data representing intersections in a second memory means;

calculating data representing a three dimensional solid shape by one of (a) addition and (b) subtraction of said data representing intersections of three-dimensional solid shapes corresponding to at least two elemental three-dimensional solid objects; and storing the calculated data in said second memory means.

8. A three-dimensional solid object manipulating method in accordance with claim 7, wherein said step of calculating data representing said three-dimensional solid shape includes the steps of calculating a volume, a center of gravity and a moment of inertia of said three-dimensional solid object.

9. A three-dimensional solid object manipulating method in accordance with claim 7, wherein said step of calculating data representing said three-dimensional solid shape includes the step of calculating data of a cross-section of said three-dimensional solid shape.

10. A three-dimensional solid object manipulating method in accordance with claim 7, wherein said step of calculating data representing said three-dimensional solid shape includes the step of calculating an addition, an intersection and a subtraction of a plurality of three-dimensional solid objects.

11. A three-dimensional solid object manipulating method in accordance with claim 7, wherein said step of calculating data representing said three-dimensional solid shape includes the step of calculating image display data.

12. Apparatus for analyzing a three-dimensional solid object comprising:

element buffer means for receiving and storing primitive data defining at least one primitive object;

graphic processor means for (a) converting the stored primitive data to run-length data;

run-length buffer means for storing said run-length data;

said graphic processor means (b) converting said stored run-length data into picture data;

picture buffer means for storing an integration of said picture data; and graphic display means for displaying a two-dimensional image of said three-dimensional solid object.

13. Apparatus according to claim 12, wherein said graphic processor means includes means for calculating a volume, a center of gravity and a moment of inertia of said three-dimensional solid object.

14. Apparatus according to claim 12, wherein said graphic processor means includes means for calculating a cross-section of said three-dimensional solid object.

* * * * *